I. H. MILLS.
BORE ENLARGING DEVICE.
APPLICATION FILED JAN. 8, 1919.
1,412,538.
Patented Apr. 11, 1922.
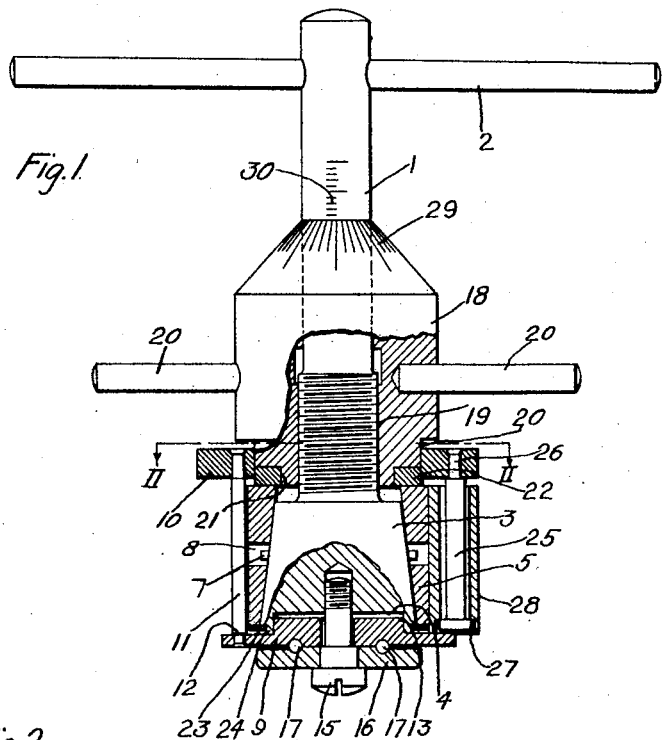
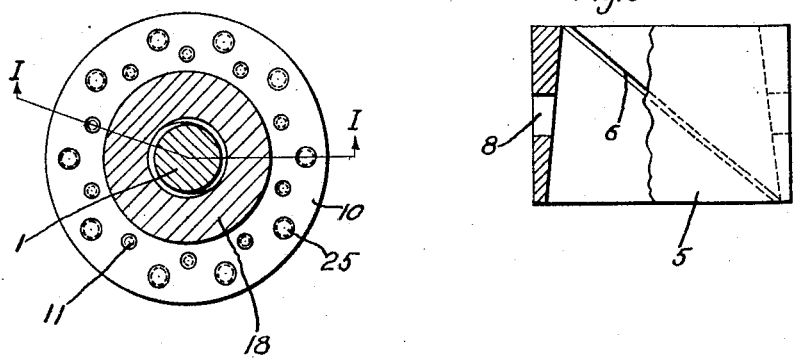
WITNESSES:
J. A. Helsel.
W. H. Woodman.
INVENTOR
Isaac H. Mills.
BY
Wesley G. Carr
ATTORNEY

UNITED STATES PATENT OFFICE.

ISAAC H. MILLS, OF TURTLE CREEK, PENNSYLVANIA.

BORE-ENLARGING DEVICE.

1,412,538.  Specification of Letters Patent.  Patented Apr. 11, 1922.

Application filed January 8, 1919. Serial No. 270,136.

*To all whom it may concern:*

Be it known that I, ISAAC H. MILLS, a citizen of the United States, and a resident of Turtle Creek, in the county of Allegheny and State of Pennsylvania, have invented a new and useful Improvement in Bore-Enlarging Devices, of which the following is a specification.

My invention relates to metal-working tools and more particularly to bore enlarging devices, and it has for its primary object the provision of a bore-enlarging device which will be unusually accurate and which will operate upon a bore or seat to be enlarged in such manner as to increase, rather than diminish, the strength and durability of the surrounding metal of which the body is composed.

Heretofore, to the best of my knowledge, bore-enlarging tools, and particularly those of the reamer type, have been formed with one or more cutting edges or blades which, during the employment of the tool, cut or scrape away metal from the wall of the bore or recess to be enlarged until such bore or recess has been brought to the desired dimensions. Because of the fact that the cutting edges or blades of the reamers, of necessity, become worn by this cutting action, it is very difficult to obtain extreme accuracy, when employing such reamers as, unless they are continually measured and adjusted, they will remove less and less metal from successive pieces of work, so that uniformity is practically impossible.

Furthermore, reamers of the cutter type are unsatisfactory for delicate work, particularly in soft metals, such as aluminum, on account of the fact that the cutting or scraping away of metal from the work being operated upon by the reamers leaves a roughened, more or less pitted and weakened surface, at the wall of the bore or recess being operated upon, with the result that this surface will be rapidly worn away when utilized as a bearing for a rotating part.

One of the chief objects of my present invention resides in the provision of a bore-enlarging device so constructed and employed that there is no cutting or scraping away of the metal surrounding the bore or recess being enlarged by the tool. With a tool thus operating, it is obvious that the necessity for any cutting edges or blades is avoided, and inaccuracies, such as have previously occurred because of wearing away of such cutting edges, are obviated.

Another object of my invention consists in providing a bore-enlarging device of such character that, in place of removing metal from the wall of the opening being enlarged, the metal constituting the wall is compressed or forced outwardly so that the surface of the opening is rendered both smooth and hard, and the metal constituting it is rendered more dense and, consequently, more resistant to wear.

With these objects in view, I have provided a bore-enlarging device which, broadly speaking, comprises a cage having a plurality of circumferentially spaced bearing pins about which are loosely mounted compression rollers adapted to engage the wall of the opening being enlarged and to roll along the surface of the wall. My invention comprises also a readily adjustable means for forcing the rollers in an outward radial direction so that the compressive action exerted by them upon the wall of the opening being enlarged may be increased, from time to time, as the size of the opening is increased through compression of the material surrounding it. Preferably, the adjusting means includes a vernier in its construction in order that all adjustments may be made with extreme accuracy and to any desired predetermined extent.

In the drawings, which illustrate a preferred form of my invention and in the several views of which similar reference numerals indicate corresponding parts, Fig. 1 is a side elevational view, partially in section on the line I—I of Fig. 2; Fig. 2 is a horizontal sectional view taken on the line II—II of Fig. 1; and Fig. 3 is an elevation, partially in section, of a split expansible sleeve forming a portion of the adjusting mechanism of the tool.

Referring more particularly to Fig. 1 of the drawings, 1 designates a suitable mandrel which may be provided, adjacent one end, with a diametrally extending handle 2 and, at its other end, with a frusto-conical expander-head 3 having a centrally located, cylindrical recess 4 in its outer face. Surrounding the expander-head 3 is a split expansible sleeve 5 which is externally cylindrical in shape and the inner face of which is inclined to uniformly engage the inclined face of the expander-head. The sleeve 5, which may be formed of any suitable resilient metal, may be split by a slot 6 which is preferably diagonally disposed, as shown in Fig. 3, in order that there shall be no continuous vertical break from top to bottom. As a means for insuring turning of the sleeve, together with the mandrel, while, at the same time, permitting longitudinal movement of the sleeve along the expander-head 3 of the mandrel, I may provide diametrally disposed pins 7 which project from the expander-head and seat in vertically disposed slots 8 formed in the sleeve.

Surrounding the sleeve 5 is a cage comprising a bottom plate 9 and a top ring 10 connected and maintained in proper spaced relation by spacer pins 11, circumferentially disposed as shown in Fig. 2. The ends of the spacer pins 11 are shouldered, as indicated at 12, and their reduced ends are passed through openings in the plate 9 and ring 10 and upset, as clearly indicated in Fig. 1. The cage, at its lower portion, may be centralized by a boss 13 formed upon the bottom plate 9 and seated in the recess 4 of the expander-head and the cage may be secured, for turning movement about the expander-head 3 and its surrounding sleeve 5 by means of a shouldered screw 15, passed loosely through a washer 16 and the bottom plate 9 and threaded axially into the lower face of the expander-head. Preferably, the engaging faces of the bottom plate 9 and washer 16 are formed with opposed annular channels to provide a race for bearing balls 17.

An adjusting nut 18 has threaded engagement with a portion of the mandrel above the expander-head 3, as indicated at 19, and is provided with handles 20 by means of which it may be readily turned. The adjusting nut 18, near its lower end, has a reduced portion 20$^a$ to snugly receive the top ring 10 of the cage and a further reduced portion 21 upon which is shrunk a bearing ring 22 which engages the upper edge of the expansible sleeve 5, the latter sleeve being held, at all times, in engagement with this ring by a resilient washer 23 interposed between the lower edge of the ring and the plate 9 and, preferably, also engaging a peripheral seat 24 formed in the lower end of the expander-head 3.

A plurality of bearing pins 25 are provided with reduced ends 26 which are passed upwardly through spaced, circumferentially disposed openings in the top ring 10 of the cage and are upset, as shown in Fig. 1, to secure them in place. The lower ends of the bearing pins 25 are formed with heads 27 which serve as retaining means for compression rollers 28 which are loosely mounted about the bearing pins in such manner as to have considerable play or movement radially, with respect to the cage, the provision for this movement being clearly disclosed in Fig. 1. At this point, it should be noted that the bearing pins, and, consequently, the rollers carried by them, are not uniformly spaced from each other, although this variation in spacing need not be great, as will be later appreciated when the reason for it is explained.

The upper portion of the adjusting nut 18 tapers uniformly to the mandrel 1 to provide a suitable surface for the radial divisions of one scale section 29 which co-operates with the longitudinally spaced divisions of another scale section 30 inscribed upon the mandrel 1, to provide a vernier by which an extremely accurate setting of the tool may be attained, as will be subsequently pointed out.

When my device is to be employed in enlarging a bearing opening or recess in a certain piece of work, the adjusting nut 18 may be turned in a counter-clockwise direction so that the expansible sleeve 5, may contract and move upwardly along the inclined surface of the expander-head 3, of the mandrel until the compression rollers 28, which engage the outer surface of the sleeve, are moved inwardly to a sufficient extent to permit the positioning of the operating head of the tool within the opening or recess to be enlarged, with the outer portions of the compression rollers in engagement with the wall of such opening.

The adjusting nut 18 may then be turned in the reverse direction, the mandrel in the meantime being held against turning movement, until the expansible sleeve 5 has been forced downwardly upon the expander-head 3 and so expanded as to force the rollers 28 into compressive engagement with the wall of the opening to be enlarged. When this has been accomplished, the mandrel 1 may be turned, in either direction, as may be convenient. This turning of the mandrel causes a corresponding turning of the sleeve 5 and, because of the frictional engagement of the various parts, the cage will turn with the mandrel and sleeve so that the compression rollers will roll along the face of the opening being enlarged, to compress the metal or other material surrounding the opening, as will be readily appreciated. From time to time, as the operation proceeds, the adjusting nut 18 may be further turned in a clockwise direction to cause an outward radial advance of the compression rollers so that the opening may be continuously enlarged, until, as indicated by the co-operating scale sections of the vernier, the desired size has been reached.

Because of the non-uniform circumferential spacing of the compression rollers, there is no tendency for the rollers to form a series of depressions in the wall of the opening being enlarged, in which they might, in time, come to roll idly as the mandrel was turned instead of being carried about with it.

From the foregoing description of the construction and the method of employing my bore-enlarging device, it will be appreciated that extremely accurate work may be continuously turned out, as there are no cutting edges or blades which will wear away. Furthermore, considerable time and labor may be saved, by the employment of my invention, because of the fact that there are no portions requiring special attention, such as is the case with cutter-reamers which must be sharpened, from time to time. However, one of the chief advantages developing from the employment of my device resides in the fact that, instead of removing metal from the wall of the opening being treated and thus producing a rough, pitted and weakened surface, particularly when the metal is relatively soft, the metal constituting the wall of the opening is compressed, rendered more dense and hardened and given an extremely smooth and polished surface that is highly resistant to wear.

In many instances, the tool may be employed in enlarging bearing-receiving recesses formed in the wall of a body, about a shaft-receiving opening formed therein, and it is for this reason that I have provided a ball-bearing between the bottom plate of the cage and the washer engaging it so that, in cases where the washer may engage against the inner wall of a recess being enlarged, the cage may turn freely while the washer may remain stationary and, as a consequence, cannot injure or wear away the metal constituting the inner wall of the recess.

Although I have illustrated but a single embodiment of my invention and have, moreover, described this embodiment in considerable detail, it will be appreciated that my invention is of such scope as to cover similar or equivalent constructions, and is to be restricted only as indicated in the claims.

I claim as my invention:

1. A bore-enlarging device including a rotatable mandrel, an expander-head forming one end of the mandrel, a cage surrounding the expander-head to rotate with the head and mandrel, compression rollers carried by the cage and disposed circumferentially of the expander-head and means co-operating with the expander-head for forcing the rollers outwardly.

2. A bore-enlarging device including a rotatable mandrel provided, at one end, with an expander-head, an expansible sleeve carried by the head to rotate therewith and adapted to be expanded and contracted through engagement with the head when reciprocated relative thereto, a cage surrounding the expander-head and sleeve and adapted to turn therewith, rollers carried by the cage and mounted for limited outward movement, the rollers being engageable by the sleeve, and means for adjustably reciprocating the sleeve to cause such movement of the rollers.

3. A bore-enlarging device including a mandrel provided with a tapered expander-head, an expansible sleeve mounted about the head and expansible through relative longitudinal movement therebetween, adjustable means for causing relative movement of the expander-head and sleeve, and compression members disposed about, and in engagement with, the sleeve.

4. A bore-enlarging device including a mandrel provided with a tapered expander-head, an expansible sleeve mounted about the head and expansible through relative longitudinal movement therebetween, adjustable means for causing relative movement of the expander-head and sleeve, and compression rollers supported about the sleeve for outward radial movement during expansion of the sleeve.

5. A bore-enlarging device including a rotatable member, an expansible member disposed thereabout, means co-operating between the members for expanding the expansible member, and a plurality of compression members surrounding the expansible member and movable outwardly upon expansion thereof.

6. A bore-enlarging device including a series of compression rollers circumferentially disposed at unequal intervals, means for moving the rollers in a circular path about their common axis and means for adjusting the rollers radially relative to such axis.

7. A bore-enlarging device including a rotatable mandrel, a cage mounted to rotate with the mandrel, compression rollers carried by the cage circumferentially disposed at unequal intervals and means for moving the rollers toward and away from the mandrel.

8. A bore-enlarging device including a rotatable mandrel, a cage mounted to rotate with the mandrel, an end plate rotatably mounted upon the cage, circumferentially disposed compression rollers carried by the cage and means for moving the rollers toward and away from the mandrel.

In testimony whereof, I have hereunto subscribed my name this 27th day of Dec. 1918.

ISAAC H. MILLS.